US012052498B2

(12) United States Patent
Wang et al.

(10) Patent No.: US 12,052,498 B2
(45) Date of Patent: Jul. 30, 2024

(54) DISTORTION COMPENSATION IN VIDEO IMAGE STABILIZATION

(71) Applicant: Apple Inc., Cupertino, CA (US)

(72) Inventors: Zejing Wang, Mountain View, CA (US); Florian Ciurea, Campbell, CA (US); Benjamin A. Darling, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 17/805,119

(22) Filed: Jun. 2, 2022

(65) Prior Publication Data
US 2022/0394180 A1 Dec. 8, 2022

Related U.S. Application Data

(60) Provisional application No. 63/197,264, filed on Jun. 4, 2021.

(51) Int. Cl.
*H04N 23/68* (2023.01)
*G06T 5/80* (2024.01)
*H04N 23/67* (2023.01)

(52) U.S. Cl.
CPC ............ *H04N 23/683* (2023.01); *G06T 5/80* (2024.01); *H04N 23/67* (2023.01); *H04N 23/687* (2023.01)

(58) Field of Classification Search
CPC .... H04N 23/683; H04N 23/67; H04N 23/687; H04N 23/81; H04N 25/61; G06T 5/006; G06T 5/80
See application file for complete search history.

(56) References Cited

U.S. PATENT DOCUMENTS

| | | | |
|---|---|---|---|
| 2017/0366755 A1* | 12/2017 | Lustig | H04N 23/683 |
| 2020/0412954 A1* | 12/2020 | Gaizman | H04N 23/687 |
| 2022/0038629 A1* | 2/2022 | Ozone | H04N 23/6811 |
| 2022/0286611 A1* | 9/2022 | Tsairi | H04N 23/6812 |
| 2022/0366547 A1* | 11/2022 | Powell | G06T 3/0012 |

\* cited by examiner

*Primary Examiner* — Shahbaz Nazrul
(74) *Attorney, Agent, or Firm* — Blank Rome LLP

(57) ABSTRACT

Devices, methods, and non-transitory program storage devices are disclosed to provide techniques for distortion compensation in images that are subject to video image stabilization (VIS), e.g., electronic image stabilization (EIS). In some embodiments, the techniques comprise: obtaining a first image captured by a first image capture device; determining a first set of image parameters configured to apply a first distortion operation (e.g., an un-distortion operation) to the first image; determining a second set of image parameters configured to apply a first stabilization operation to a first version of the first image that has already had the first distortion operation applied; determining a third set of image parameters configured to apply a second distortion operation (e.g., an idealized, field of view-preserving, re-distortion operation) to the first image; and applying the determined first, second, and third sets of image parameters to the first image to generate a distortion-compensated and stabilized output image.

28 Claims, 6 Drawing Sheets

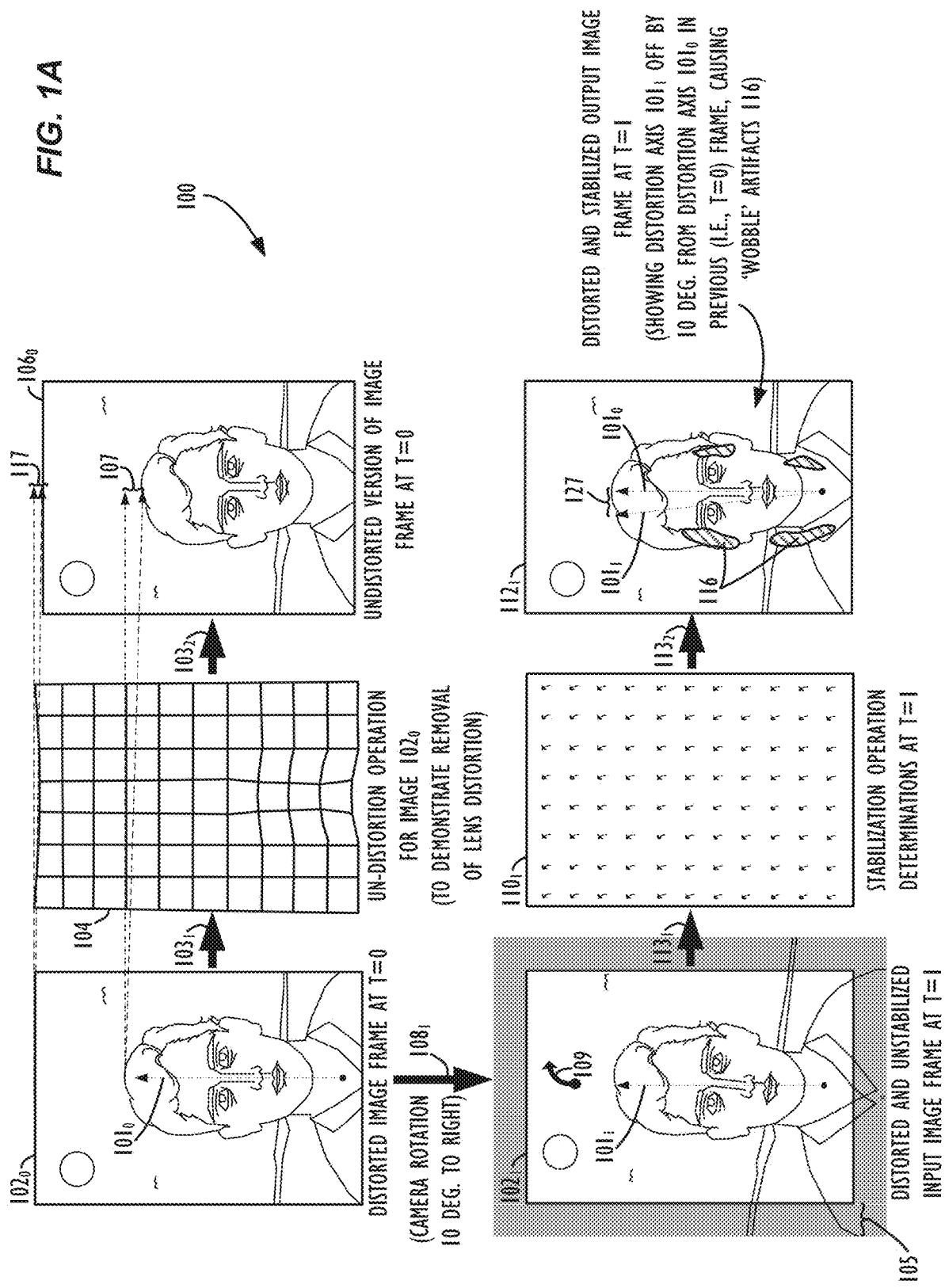

```
┌─────────────────────────────────────────────────────────────────────────┐ ╱─204
│  DETERMINE A FIRST SET OF IMAGE PARAMETERS CONFIGURED TO APPLY A FIRST DISTORTION │
│                    OPERATION TO THE FIRST IMAGE                         │
│  ┌─────────────────────────────────────────────────────────── ╱─260 ─┐  │
│  │ DETERMINE A FIRST TWO-DIMENSIONAL (2D) MESH OF VERTEX POINTS DISTRIBUTED OVER │
│  │                        THE FIRST IMAGE                  ╱─262     │  │
│  │  ┌────────────────────────────────────────────────────────────┐   │  │
│  │  │ DETERMINE A DENSITY FOR THE VERTEX POINTS IN THE 2D MESH OF VERTEX POINTS, │
│  │  │ WHEREIN THE DETERMINED DENSITY IS BASED, AT LEAST IN PART, ON AN ESTIMATED │
│  │  │ AMOUNT OF DISTORTION IN IMAGES CAPTURED BY THE FIRST IMAGE CAPTURE DEVICE │
│  │  │                                              ╱─264         │   │  │
│  │  │  ┌──────────────────────────────────────────────────────┐  │   │  │
│  │  │  │ WHEREIN THE DETERMINED DENSITY COMPRISES A NON-UNIFORM DENSITY ACROSS │
│  │  │  │              THE 2D MESH OF VERTEX POINTS            │  │   │  │
│  │  │  └──────────────────────────────────────────────────────┘  │   │  │
│  │  └────────────────────────────────────────────────────────────┘   │  │
│  └──────────────────────────────────│──────────────────────────────────┘│
│                                     ▼                     ╱─266         │
│  ┌─────────────────────────────────────────────────────────────────┐    │
│  │ DETERMINE A SET OF ONE MORE DISTORTION PARAMETERS FOR EACH VERTEX POINT IN │
│  │ THE FIRST 2D MESH OF VERTEX POINTS, WHEREIN THE FIRST SET OF IMAGE PARAMETERS │
│  │  COMPRISES THE DETERMINED SET OF ONE MORE DISTORTION PARAMETERS FOR EACH │
│  │             VERTEX POINT IN THE FIRST 2D MESH OF VERTEX POINTS  │    │
│  └─────────────────────────────────────────────────────────────────┘    │
└─────────────────────────────────────────────────────────────────────────┘
```

FIG. 2C

```
┌─────────────────────────────────────────────────────────────────────────┐ ╱─204
│  DETERMINE A FIRST SET OF IMAGE PARAMETERS CONFIGURED TO APPLY A FIRST DISTORTION │
│                    OPERATION TO THE FIRST IMAGE                         │
│                                                           ╱─270         │
│  ┌─────────────────────────────────────────────────────────────────┐    │
│  │ DETERMINE A SET OF ONE MORE DISTORTION PARAMETERS FOR EACH PIXEL IN THE FIRST │
│  │ IMAGE, WHEREIN THE FIRST SET OF IMAGE PARAMETERS COMPRISES THE DETERMINED SET │
│  │  OF ONE MORE DISTORTION PARAMETERS FOR EACH PIXEL IN THE FIRST OUTPUT IMAGE │
│  └─────────────────────────────────────────────────────────────────┘    │
└─────────────────────────────────────────────────────────────────────────┘
```

FIG. 2D

DISTORTION COMPENSATION IN VIDEO IMAGE STABILIZATION

TECHNICAL FIELD

This disclosure relates generally to the field of image processing. More particularly, but not by way of limitation, it relates to techniques for performing distortion compensation in images that are subject to video image stabilization (VIS), which may include aspects of both electronic image stabilization (EIS) and optical image stabilization (OIS).

BACKGROUND

Handheld or personal video image capture devices often employ VIS, e.g., involving EIS and/or OIS stabilization operations, on captured video images frames to stabilize the captured video. One way to stabilize a video is to track a salient feature in the image and use this as an anchor point to "cancel out" all perturbations relative to it. This approach requires a priori knowledge of the image's content to, for example, identify and track a person or other salient object in the scene. Another approach to image stabilization searches for a "background plane" in a video sequence and uses its observed distortion to correct for camera motion. These types of techniques that involve software- and/or hardware-enabled transformations to "warp" a captured image so as to "cancel out," i.e., stabilize, the jitter caused by camera movement after-the-fact are referred to herein as "electronic image stabilization" or EIS techniques. Another approach may use the output from a motion sensor, e.g., a gyroscope, as an input for estimating the amount of "warping" that needs to be done via the EIS transformations in order to stabilize the video frames.

In another approach, gyroscopically controlled electromagnets (or other suitable mechanisms) shift a floating lens element orthogonally to the lens barrel axis (i.e., the "optical axis") along the horizontal and vertical plane of the image and/or along the optical axis in a direction that is opposite that of the camera movement. Doing this can effectively neutralize any sign of camera shake. In a similar type of operation, a camera's imaging sensor may translate in the opposite direction of the camera's movements in order to dampen the effects of camera shake. These types of techniques that involve hardware-enabled corrections in the position of the image capture apparatus, e.g., by moving one or more elements in the optical stack, the image sensor itself, or the entire camera system, so as to "cancel out" the jitter caused by camera movement in "real-time" will be referred to herein as "optical image stabilization" or OIS techniques.

As mentioned above, the application of VIS is typically done by determining warping operations for each individual captured video image frame, in such a way that the resulting sequence of warped video image frames produces a stabilized video (or as closed to stabilized as possible, e.g., subject to the availability of a sufficient amount of overscan pixels around the periphery of the displayed portion of the captured video images to accommodate the determined warpings).

To perform the warping operations, EIS systems typically assume a projection model for the camera's optics, e.g., typically a planar projection model, which is appropriate for optics that are designed for (or have been distortion-corrected to) a rectilinear projection. In fact, for most lenses, the optics can be designed to have sufficiently close to an ideal rectilinear projection, such that distortion correction operations (e.g., operations to remove lens distortion in the captured images) may be avoided altogether, so as to save power, processing resources, degradation in image sharpness, and/or potential losses to the image's field of view (FOV) (e.g., caused by the fact that the distortion-corrected image may no longer be a perfect rectangle, and thus have to be cropped down, if only slightly, back to a rectangular shape, before it is stored and/or displayed on a user's device).

However, even very slight departures from ideal rectilinear projections have been shown to produce unwanted video artifacts—especially in situations where the amount of VIS being applied to the captured image frames is very strong (e.g., when a user of an image captured device capturing a stream of video image frames is walking, jogging, or otherwise moving or rocking the image capture device, such as in a rhythmic or repeated fashion over the duration of the video capture). These unwanted video artifacts may present themselves visually as a "wobbling" artifact in the stabilized video sequences, wherein structures and objects in the stabilized video may appear to pulsate or otherwise move during the duration of the stabilized video. Thus, there is a need for methods, apparatuses, computer readable media, and systems to provide for distortion compensation in video image stabilization operations.

SUMMARY

Devices, methods, and non-transitory program storage devices (NPSDs) are disclosed herein to provide for distortion compensation in images that are subject to video image stabilization operations, e.g., including electronic image stabilization and/or optical image stabilization.

According to some embodiments, there is provided a device, comprising: a first image capture device, wherein the first image capture device comprises a first lens having a first set of lens characteristics; a display; a memory; and one or more processors operatively coupled to the memory, wherein the one or more processors are configured to execute instructions causing the one or more processors to: obtain a first image captured by the first image capture device; determine a first set of image parameters configured to apply a first distortion operation to the first image; determine a second set of image parameters configured to apply a first stabilization operation to a first version of the first image that has already had the first distortion operation applied; and apply the determined first set of image parameters and the determined second set of image parameters to the first image to generate a first output image, wherein the first output image is distortion-compensated and stabilized. In some cases, the first distortion operation may be based on approximating a rectilinear projection for the first image. In other cases, the first distortion operation may instead be based on approximating a curvilinear projection for the first image, wherein the first distortion operation is further configured to remove curvilinear distortion in images captured by the first image capture device. If desired, the device may also crop the first output image to have a first set of desired dimensions or a first desired aspect ratio.

In some such embodiments, the instructions further comprise instructions causing the one or more processors to: determine a third set of image parameters configured to apply a second distortion operation to a second version of the first image that has already had the first distortion operation and the first stabilization operation applied, wherein the instructions to apply the determined first set of image parameters and second set of image parameters to the first image further comprise instructions to: apply the determined first set of image parameters, second set of image parameters, and third set of image parameters to the first image to generate the first output image. In some cases, the first distortion operation is configured to remove distortion in images captured by the first image capture device, while the second distortion operation is configured to re-apply an idealized distortion pattern (e.g., computed on, and aligned to, the first output image). In some embodiments, the third set of image parameters may likewise be applied in a single pass operation, along with the image modifications specified by the determined first and second sets of image parameters.

In still other embodiments, the instructions causing the one or more processors to determine a first set of image parameters configured to apply a first distortion operation to the first image further comprise instructions configured to cause the one or more processors to: determine a first two-dimensional (2D) mesh of vertex points distributed over the first image; and determine a set of one more distortion parameters for each vertex point in the first 2D mesh of vertex points, wherein the first set of image parameters comprises the determined set of one more distortion parameters for each vertex point in the first 2D mesh of vertex points. In some cases, the one or more processors may further determine a density for the vertex points in the 2D mesh of vertex points (e.g., a uniform or non-uniform density across the extent of the first output image), wherein the determined density is based, at least in part, on an estimated amount of distortion in images captured by the first image capture device. In alternative embodiments, the instructions causing the one or more processors to determine a first set of image parameters configured to apply a first distortion operation to the first image further comprise instructions configured to cause the one or more processors to: determine a set of one more distortion parameters for each pixel in the first image (i.e., rather than a 2D mesh of vertex points), wherein the first set of image parameters comprises the determined set of one more distortion parameters for each pixel in the first output image.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

BRIEF DESCRIPTION OF THE DRAWINGS

FIG. 1A illustrates an example of performing video stabilization on images that are not subjected to prior distortion compensation operations.

FIG. 2A-2D are flow charts illustrating methods of providing for distortion compensation in images that are subject to video stabilization, according to various embodiments.

DETAILED DESCRIPTION

Figure 1B:
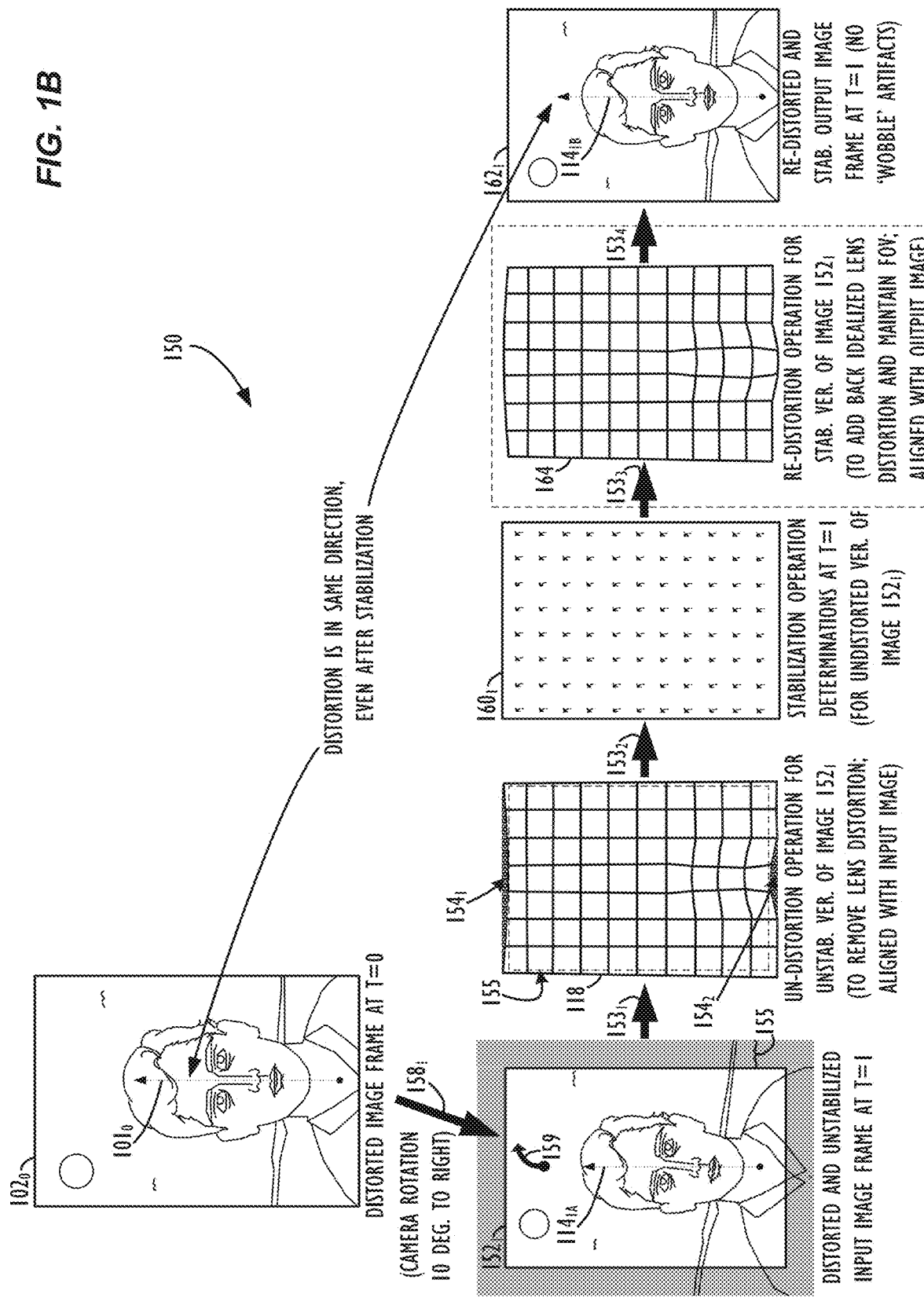
FIG. 1B illustrates an example of performing video stabilization on images that are subjected to prior distortion compensation operations, according to various embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Exemplary Distortion Compensation and Electronic Image Stabilization Operations

Turning now to FIG. 1A, an example 100 of performing video stabilization on images that are not subjected to prior distortion compensation operations is illustrated. Image $102_0$ represents an image captured by an exemplary image capture device having a first lens with a first set of lens characteristics. The subscript '0' for input image $102_0$ indicates that this image was taken at a time, T, equal to an index value of 0, e.g., the first image captured in a sequence of video image frames that are to be stabilized. It is to be understood that larger subscripts, e.g., $102_1$, $102_2$, $102_3$, and so on, would represent subsequent images captured by the image capture device later in the capture of the sequence of video image frames. The scene content of exemplary image $102_0$ include a human subject standing on a beach. As will be described below, in this example 100, there is some amount of distortion introduced in the image as captured by the first lens of the exemplary image capture device, which, in this case, is illustrated by distortion axis arrow $101_0$, and which may be manifested in an elongated or stretched look through the center of the human subject's face. It is to be understood that lens distortion may manifest itself in many different ways—and in many different portions of a given lens's FOV, e.g., depending on the lens optics and other physical properties of the image capture device. It is also to be understood that, in many implementations, e.g., based on the capturing lens's characteristics, it may not be necessary or desirable to further remove lens distortion from captured video images (e.g., if the attendant tradeoffs in terms of loss of FOV and/or sharpness, etc., are greater than the perceived benefits of reducing the lens distortion).

Following arrow $103_1$ to the right from image $102_0$, an exemplary mesh 104 for applying a distortion operation (in this case an un-distortion operation) that could be applied to images captured by the first lens of the image capture device is illustrated. It is to be understood that the distortion operations described herein may be implemented as a set of per-pixel warping operations, a set of pixel warping operations specified for the vertex points of a mesh that may be interpolated between for image pixels not located at the mesh vertex points, estimated global homography matrices, and the like. In some cases, the values embodied in mesh 104 may be determined as part of a factory calibration process for a given lens or simply be determined based on provided lens design specifications for the given lens. The use of exemplary mesh 104 in this example is merely intended to be illustrative of the potential effects a distortion operation (e.g., an "un-distortion" operation) could have on a captured image's scene content and/or FOV.

Following arrow $103_2$ to the right from exemplary mesh 104, an exemplary undistorted version $106_0$ of the image $102_0$, captured at a time T=0, is shown. In this example, as illustrated by arrows 107, the un-distortion operation applied by exemplary mesh 104 has removed the aforementioned unnatural elongated look of the human subject's face, making the overall height of the face somewhat smaller—and more natural-looking. However, as a consequence of the warping applied by exemplary mesh 104 in this example, and as illustrated by arrows 117, the undistorted version $106_0$ had to be cropped slightly to return to a rectangular shape, thus resulting in a slightly reduced FOV from that of image $102_0$. As will be appreciated, depending on the lens distortion pattern of a given lens, the amount of FOV lost in an undistorted image frame may or may not be objectionable in a given implementation.

Turning now to arrow $108_1$, pointing down from image $102_0$, a second image, image $102_1$, captured at a subsequent time, T=1, is shown. In this example, as indicated by arrow 109, a user of the image capture device has apparently rotated the image capture device by 10 degrees to the right between the capture of image $102_0$ at T=0 and image $102_1$ at T=1. Thus, input image $102_1$ represents a distorted and unstabilized image frame captured at T=1. As is illustrated by distortion axis arrow $101_1$, the rotation of the image capture device at T=1 has also caused the direction of the distortion to rotate with respect to the captured scene content. In other words, although the lens distortion pattern in this example continues to manifest in an elongated or stretched look through the center of the captured image frame, because the image capture device has been rotated, the distortion axis now no longer aligns exactly with the central axis of the nose of the human subject, and instead is rotated by the aforementioned ten degrees with respect to the human subject's face as captured in image $102_1$.

Next, following arrow $113_1$ to the right from image $102_1$, in the example 100, a set of electronic image stabilization operations $110_1$ are determined, i.e., in order to stabilize the scene content of image $102_1$ with respect to image $102_0$. As illustrated in FIG. 1A, in this example, a counter-rotation of all image pixels by 10 degrees to the left is determined, i.e., in order to compensate for the aforementioned rotation of the image capture device by 10 degrees to the right between the captures of images $102_0$ and image $102_1$. As described above, image stabilization warping parameters may be determined for each individual pixel, for groups of pixels, for a subset of rows of the image, for a subset of columns of the images, for a 2D mesh of points distributed over the extent of the image, etc., as is desired by a given implementation. According to some embodiments, an image overscan region 105 (shown in darker shading outside the borders of image $102_1$) may be used by the EIS operations in the implementation of the determined stabilization warping operations, without having to reduce the FOV of the stabilized image (i.e., assuming there is sufficient overscan to account for the determined stabilization warping operations).

Following arrow $113_2$ to the right from image stabilization operations $110_1$, a distorted, but stabilized, output image frame at T=1 ($112_1$) is shown that exhibits one or more so-called wobble artifacts 116, which may present themselves visually as areas of "wobbling" in the stabilized video sequences, wherein, e.g., portions of rigid structures in the captured video image frames appear to be pulsing or moving in localized and seemingly arbitrary patterns during playback of the stabilized video. As shown in output image $112_1$, the distortion axis arrow $101_0$, introduced above with respect to image $102_0$, and the distortion axis arrow $101_1$, are offset from each other by a rotation angle 127, due to the rotation of the image capture device between time T=0 and time T=1 in this example. As may now be appreciated, in this example 100, the lack of an un-distortion operation being applied to input image $102_1$ results in the there being a lens distortion pattern present in the individual captured images in the video sequence, which will move around a small amount from frame to frame with respect to the scene content as the video is stabilized (e.g., as illustrated by rotation angle 127), thereby producing the wobble artifacts. The wobble artifacts may also be caused, in part, by the stabilization operation attempting to stabilize portions of the capturing lens having differing physical lens characteristics from one another. In other words, while the EIS operation is stabilizing the captured scene content in the image, it is also simultaneously causing the lens distortion pattern to become de-stabilized—resulting in the potential for the unwanted wobble artifacts 116 in the stabilized video sequence.

One solution to this issue of the lens distortion pattern becoming destabilized with respect to the lens's optical center may be to perform the distortion compensation operations on captured images prior to the performance of electronic image stabilization operations. In this way, because there is no longer any distortion in the captured images, there is no longer slight movements in the distortion pattern from frame to frame in the video sequence, which has been found to reduce or eliminate the presence of wobble artifacts.

Turning now to FIG. 1B, an example 150 of performing video stabilization on images that are subjected to prior distortion compensation operations is illustrated, according to various embodiments disclosed herein. The image $102_0$ along the top row of example 150 is unchanged from its counterpart in example 100 of FIG. 1A, and thus is not discussed further here. Turning now to arrow $158_1$, in example 150 of FIG. 1B, a user of the image capture device has again rotated the image capture device by 10 degrees to the right between the capture of image $102_0$ at T=0 and image $152_1$ at T=1, as illustrated by arrow 159. Despite the image capture device's rotation, however, the direction of distortion axis arrow $114_{3A}$ remains the same as that of distortion axis arrow $101_1$, with respect to the input image frame (though not with respect to the captured scene content, which has rotated between T=0 and T=1). Thus, image $152_1$ represents a distorted and unstabilized image frame captured at T=1.

As explained above, in example 150, following arrow $153_1$ to the right from input image $152_1$, rather than applying an electronic image stabilization operation, first, an exemplary distortion warping mesh 118 may be applied to the input image $152_1$ that is aligned with the input image $152_1$. In some embodiments, the warp parameters applied by mesh 118 may be computed for each pixel that will exist in the output image— but using distortion parameters from the input image. In some cases, this may be done by using EIS warp parameters (e.g., as determined by electronic image stabilization operations $160_1$, discussed below) to map between output image pixels and input image pixels, thereby allowing distortion parameters to be computed at each exact pixel location in the output image. As illustrated, regions $154_1$ and $154_2$ reflect regions of the distorted image frame that will not be present in the un-distorted image frame, i.e., as a result of the un-distortion operation being applied. Also present in this mesh 118 is an annotation of a dashed-line crop region 155, which illustrates the extent to which the FOV of the undistorted and stabilized output image frame at T=1 ($162_1$) may be reduced with respect to the FOV of the original or "unprocessed" distorted and unstabilized image frame at T=1 ($152_1$), e.g., if no subsequent "re-distortion" operation is applied to the image data, as will be discussed in greater detail below.

Next, following arrow $153_2$ to the right from mesh 118, in the example 150, a set of electronic image stabilization operations $160_1$ are determined to stabilize the scene content of image $152_1$ with respect to image $102_0$. As with the example 100 illustrated in FIG. 1A, in this example 150, a counter-rotation of all image pixels by 10 degrees to the left is determined to compensate for the aforementioned rotation of the image capture device by 10 degrees to the right. However, unlike in the example 100 illustrated in FIG. 1A, in this example 150, by applying the un-distortion warping operation to the lens's optical center prior to the electronic image stabilization operations $160_1$, there is no longer any distortion in the captured image content that has the potential to be misaligned from frame to frame in the stabilized video sequence, thereby mitigating the presence of any wobble artifacts.

As mentioned above, the FOV of the undistorted and stabilized output image frame at T=1 ($162_1$) may be reduced with respect to the FOV of the original or "unprocessed" distorted and unstabilized image frame at T=1 ($152_1$) if no subsequent "re-distortion" operation is applied to the image data, i.e., reduced to the FOV indicated by crop region 155. If maintaining an equivalent FOV in the undistorted and stabilized image frame is important to a given implementation, then, following arrow $153_3$ to the right from electronic image stabilization operations $160_1$, in some embodiments, a re-distortion operation (e.g., as illustrated by mesh 164) may optionally be applied to the stabilized version of image $152_1$. In some embodiments, the re-distortion operation may be configured to add back in an idealized lens distortion that is centered at (and aligned with) the output image frame $162_1$'s center, i.e., as opposed to at the input image frame's center. This re-distortion operation has the result of effectively shifting the distortion's optical center from the center of the input image to the center of the output image. Because the lens distortion pattern is fixed to the stabilized output image, i.e., rather than to the unstabilized input image, the appearance of the wobble artifacts may be mitigated or eliminated entirely. The re-distortion operation may also have the effect of restoring the FOV of the output image frame to the original input image frame's FOV. (Note: The optional nature of the application of the re-distortion operation applied by mesh 164 is indicated by the dashed line box around mesh 164 in FIG. 1B.)

Finally, following arrow $153_4$ to the right from mesh 164, a re-distorted and stabilized image frame at T=1 ($162_1$) may be generated, with an FOV similar (or equal) to that of the original or "unprocessed" distorted and unstabilized input image frame at T=1 ($152_1$). Due, at least in part, to the removal of the lens distortion prior to the stabilization operations $160_1$, when the idealized distortion is re-applied by mesh 164, the direction of distortion axis arrow $114_{1B}$ remains the same as that of distortion axis arrow $101_1$, with respect to both the input image frame and the captured scene content (which has been stabilized between T=0 and T=1). As may now be appreciated, while the output image $112_1$ in the example 100 of FIG. 1A exhibits one or more wobble artifacts 116, due, at least in part, to the direction of the lens distortion being the same between image $102_0$ and output image $162_1$ with respect to the captured scene content, the output image $162_1$ in the example of 150 of FIG. 1B is free from such wobble artifacts.

Exemplary Methods for Performing Distortion Compensation in Electronic Image Stabilization Operations FIGS. 2A-2D are flow charts illustrating methods of providing for distortion compensation in images that are subject to video stabilization, according to various embodiments.

Figure 2A:
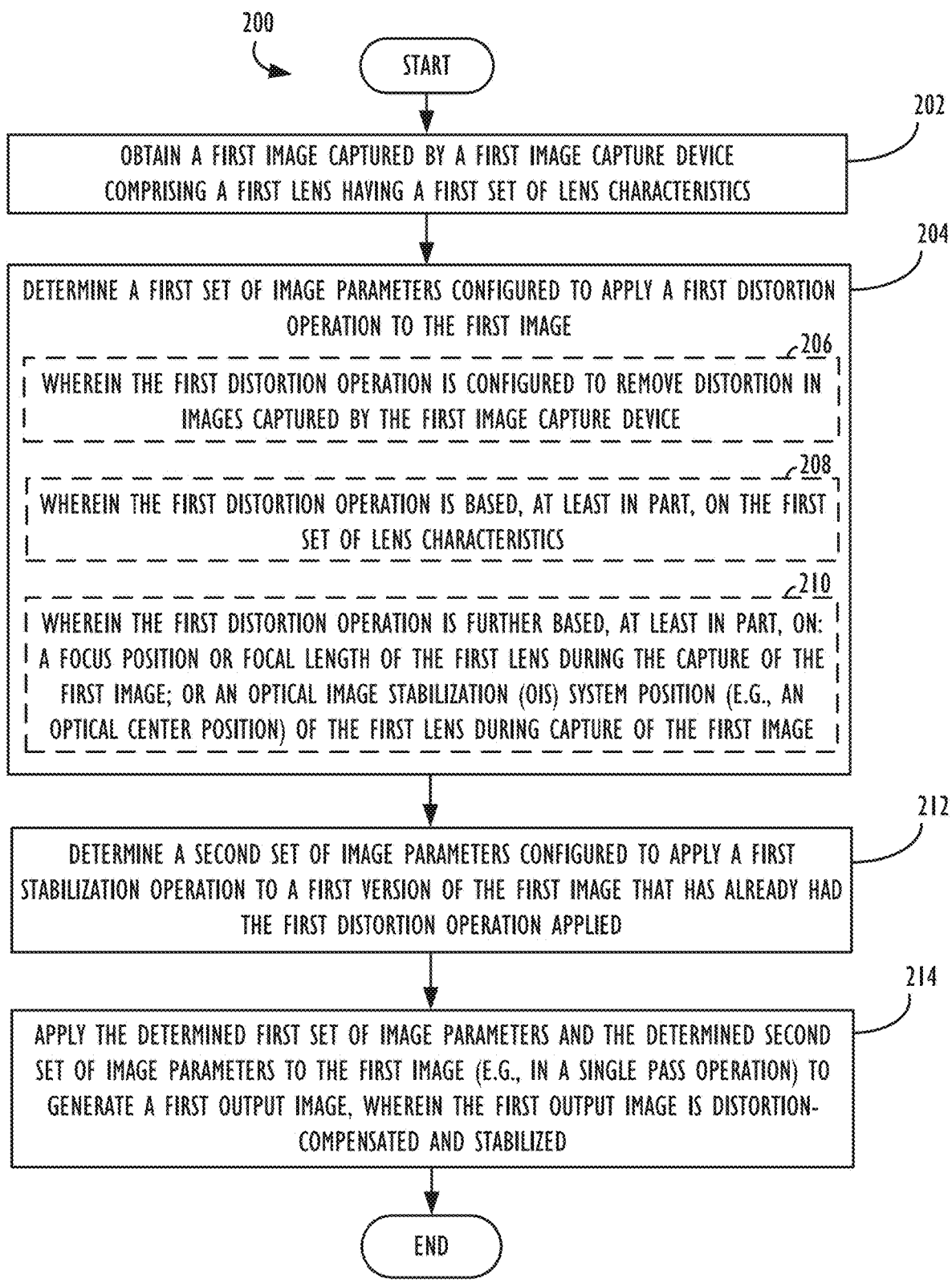

Turning first to FIG. 2A, a method 200 is illustrated for providing distortion compensation in images that are subject to video stabilization. First, at Step 202, the method 200 may obtain a first image captured by a first image capture device comprising a first lens having a first set of lens characteristics (e.g., characteristics comprising one or more physical properties of the lens and/or calibration parameters related to the lens and/or its image capture abilities). Next, at Step 204, the method 200 may determine a first set of image parameters configured to apply a first distortion operation to the first image. In some cases, the first distortion operation may be configured to remove distortion in images captured by the first image capture device (Step 206), e.g., distortions based, at least in part, on the first set of lens characteristic (Step 208). According to some embodiments, the first distortion operation may be determined, at least in part, as part of a factory calibration process performed on the first lens or first lens's design specifications. In some other cases, the first distortion operation may be further based, at least in part, on one or more of: a focus position of the first lens during the capture of the first image (e.g., as determined by an autofocus (AF) system or set manually by a user); a focal length of the first lens during the capture of the first image; or an Optical Image Stabilization (OIS) system position (e.g., an optical center position) of the first lens during the capture of the first image (Step 210). As may be appreciated, any movement or changes in the position of the first lens from a default positioning may result in the need for further alterations or modifications to the first distortion operation in order to properly account for the predicted distortion effects of the first lens at its position when the first image is captured.

Next, at Step 212, the method 200 may determine a second set of image parameters configured to apply a first stabilization operation to a first version of the first image that has already had the first distortion operation applied. In some cases, the first stabilization may comprise one or more EIS operations, e.g., operations wherein a warping is determined for each pixel (or groups of pixels) in a given image frame in such a way that the resulting sequence of video image frames produces a stabilized video (i.e., subject to the availability of a sufficient amount of overscan pixels around the periphery of the displayed portion of the captured image to accommodate the determined warpings).

Finally, at Step 214, the method 200 may apply the determined first set of image parameters and the determined second set of image parameters to the first image (e.g., in a single pass operation) to generate a first output image, wherein the first output image is distortion-compensated and stabilized. Although not necessary, applying the first and second sets of parameters in a single pass operation, e.g., by submitting the first and second sets of image parameters to a processing unit (e.g., a central processing unit (CPU) or graphics processing unit (GPU)) together, such as in the form of a single 2D mesh of values for a set of vertex points distributed across the extent of the first output image (or a value for each pixel in the first output image), may save additional processing resources. For example, in some embodiments, the values submitted to the processing unit may reflect the resulting manipulations that need to be applied to the corresponding first output image pixels based on the application of the first distortion operation and then the first stabilization operation in sequence—while only requiring a single pass of modifications to the first output image's actual pixel data.

While the above techniques of method 200 should provide for a completely undistorted and stabilized image (at least to the extent possible, based on the image capture device's characteristics and the scene being captured) that does not reflect any so-called 'wobble' stabilization artifacts (which, e.g., as described above, may be caused by attempting to undistort an image after it has been stabilized, thereby resulting in the un-distortion operations not being applied to the actual optical center of the captured first image), one tradeoff may be a reduced field of view (FOV) in the first output image, e.g., as compared to the first image, e.g., owing to the fact that the un-distortion operations may cause the first output image to have a non-rectangular shape, which may, in some implementations, need to be cropped down to a rectangular shape before being displayed or sent to another application for display or use. Thus, according to some embodiments, e.g., as discussed below with reference to FIG. 2B, additional processing may be desired to restore an FOV that is the same as (or closer to) the FOV of the captured first image, while still compensating for any potential distortion-related artifacts that may otherwise have been caused by VIS operations being performed on the first image.

Figure 2B:
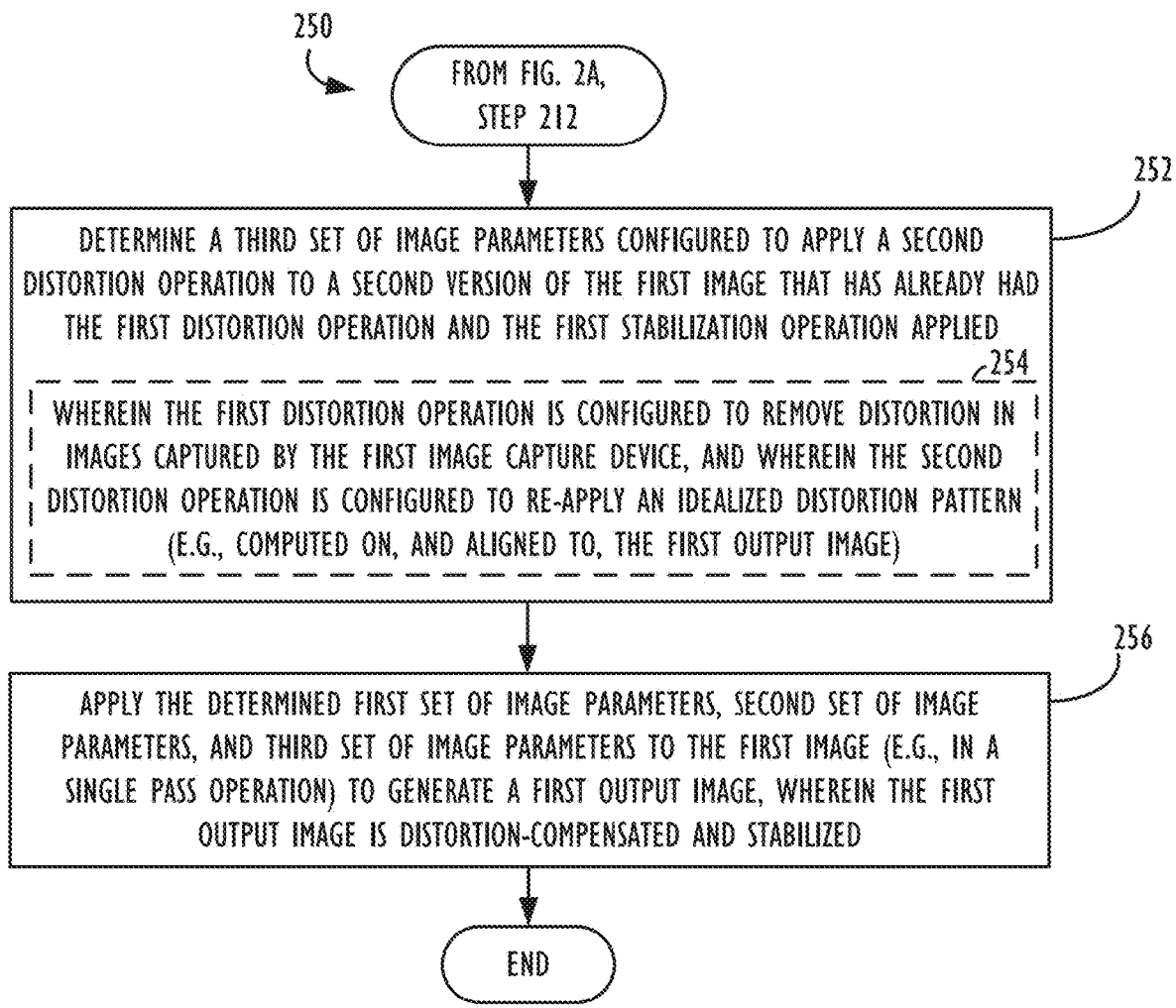

Turning now to FIG. 2B, a method 250 is illustrated providing further details to the method 200 of performing distortion compensation in images that are subject to video stabilization, which was first introduced above in FIG. 2A. First, at Step 252, the method 250 may continue operations from Step 212 of FIG. 2A by determining a third set of image parameters configured to apply a second distortion operation to a second version of the first image that has already had the first distortion operation and the first stabilization operation (i.e., as defined in method 200 of FIG. 2A) applied. In some cases, the first distortion operation may be configured to remove distortion in images captured by the first image capture device, while the second distortion operation is configured to re-apply an idealized distortion pattern (e.g., computed on, and aligned to the first output image), thereby restoring more of (or all) of the captured first image's original FOV.

Next, at Step 256, the method 250 may apply the determined first set of image parameters, second set of image parameters, and third set of image parameters to the first image (again, e.g., in a single pass operation, in order to conserve processing resources) to generate a first output image, wherein the first output image is distortion-compensated and stabilized. As with the discussion of Step 214 of FIG. 2A above, the performance of Step 256 of FIG. 2B may comprise submitting the values reflecting the resulting manipulations that need to be applied to the corresponding first output image pixels based on the application of the first distortion operation, then the first stabilization operation, and then the second distortion operation (e.g., the above-mentioned operation configured to re-apply an idealized distortion operation aligned with a stabilized output image) in sequence, while only requiring a single pass of modifications to the first output image's pixel data. In other embodiments, rather than applying the first distortion operation, first stabilization operation, and/or the second distortion operation in a single pass operation as has been described above, e.g., in a single 2D array or mesh of warp parameters, one or more of the first distortion operation, first stabilization operation, and second distortion operation may be performed on actual image pixel date in a sequential order, with each such operation resulting in the generation of a new "intermediate" image result, which may be fed to the next operation, until generation of the final output image.

Turning now to FIG. 2C, further details are provided as to Step 204 of the method 200 of performing distortion compensation in images that are subject to video stabilization, first introduced in FIG. 2A. As a reminder, Step 204 comprises the method 200 determining a first set of image parameters configured to apply a first distortion operation to the first image. Then, according to some embodiments, at Step 260, the operations of Step 204 may further comprise determining a first two-dimensional (2D) mesh of vertex points distributed over the first image. In some cases, at Step 262, the method 200 may further determine a density for the vertex points in the 2D mesh of vertex points, wherein the determined density is based, at least in part, on an estimated amount of distortion in images captured by the first image capture device. For example, in some cases, if a 2D mesh is being used, the density determination may comprise determining how far apart to spaces each of the columns and rows of the 2D mesh of vertex points across the extent of the image. In some cases, the determined density may comprise a simple uniform density across the 2D mesh of vertex points, while, in other cases, the determined density may comprise a non-uniform density across the 2D mesh of vertex points (Step 264). For example, depending on the characterization and unique physical properties of the first lens used to capture the first image, it may be desirable to "sample" certain parts of the first lens's FOV, e.g., those exhibiting greater amounts of distortion, with a greater density of mesh points (in other words, have more fine-grained determinations of the distortion-compensated stabilization warpings to be applied to pixels or groups of pixels in the first output image in such certain parts), while it may be sufficient to sample other parts of the first lens's FOV, e.g., those exhibiting lesser amounts of distortion, with a lower density of mesh points (in other words, have more coarse determinations of the distortion-compensated stabilization warpings to be applied to pixels or groups of pixels in the first output image in such other parts).

Next at Step 266, the operations of Step 204 may further comprise determining a set of one more distortion parameters for each vertex point in the first 2D mesh of vertex points, wherein the first set of image parameters determined as part of Step 204 comprises the determined set of one more distortion parameters for each vertex point in the first 2D mesh of vertex points. These parameters may then be passed on for the performance of Step 212 in FIG. 2A, i.e., to determine the second set of image parameters configured to stabilize an un-distorted version of the first image pixel data.

Turning now to FIG. 2D, alternative further details are provided as to Step 204 of the method 200 of performing distortion compensation in images that are subject to video stabilization, first introduced in FIG. 2A. As a reminder, Step 204 comprises the method 200 determining a first set of image parameters configured to apply a first distortion operation to the first image. Then, according to some embodiments, at Step 270, the operations of Step 204 may further comprise determining a set of one more distortion parameters for each pixel in the first image, wherein the first set of image parameters comprises the determined set of one more distortion parameters for each pixel in the first output image. These parameters may then be passed on for the performance of Step 212 in FIG. 2A, i.e., to determine the second set of image parameters configured to stabilize an un-distorted version of the first image pixel data.

It is to be understood that the optional implementations details described above in reference to FIGS. 2C and 2D, with regard to determining the first set of image parameters, may be applied mutatis mutandis to the determination of the second set of image parameters (e.g., at Step 212) and/or the determination of the third set of image parameters (e.g., at Step 252), e.g., so that the second set of image parameters and/or third set of image parameters may also be determined in the form of a 2D-mesh of vertex point values or a set of values for each individual pixel in the first output image.

While it may be preferable to have the same number of image parameter values in each of the determined first, second, and third image parameter sets—and to have those image parameter values be aligned at the same locations across the extent of the first output image—if the numbers and/or locations of the determined image parameters for any of the first, second, or third sets do not initially align, appropriate interpolation (or other estimation) methods may be employed to ensure that aligning image parameter values are determined for each of the first, second, and third sets, such that a single mesh (or other desired array of values) of combined warping values, i.e., values reflecting the combined performance of the first distortion operation (e.g., an un-distortion operation), the first stabilization operation and, if desired, the second distortion operation (e.g., a re-distortion operation), may be submitted to a selected processing unit (e.g., a CPU or GPU) together for the performance of the image pixel warpings in a single pass operation.

Exemplary Electronic Computing Devices

Figure 3:
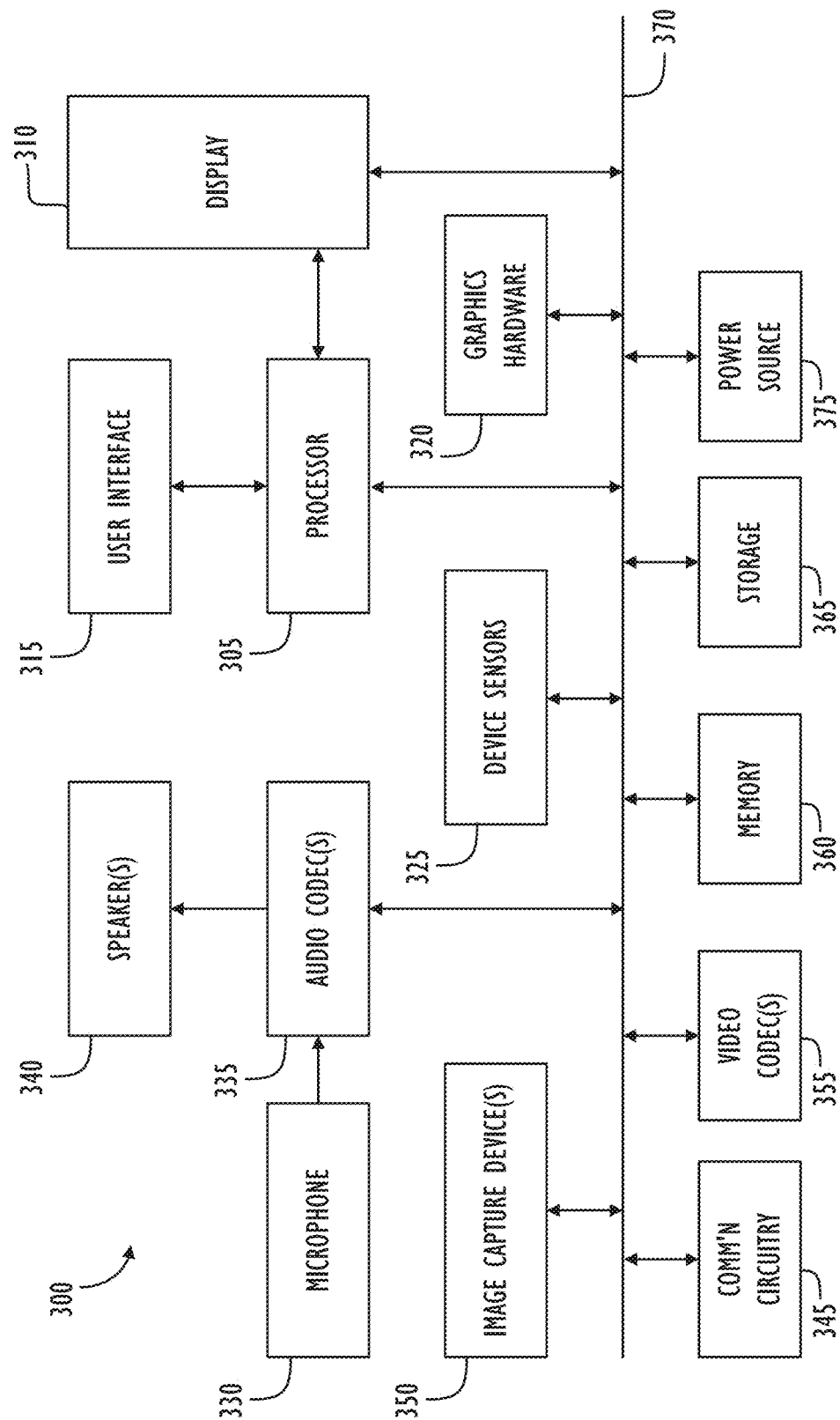
FIG. 3 is a block diagram illustrating a programmable electronic computing device, in which one or more of the techniques disclosed herein may be implemented.

Referring now to FIG. 3, a simplified functional block diagram of illustrative programmable electronic computing device 300 is shown according to one embodiment. Electronic device 300 could be, for example, a mobile telephone, personal media device, portable camera, or a tablet, notebook or desktop computer system. As shown, electronic device 300 may include processor 305, display 310, user interface 315, graphics hardware 320, device sensors 325 (e.g., proximity sensor/ambient light sensor, accelerometer, inertial measurement unit, and/or gyroscope), microphone 330, audio codec(s) 335, speaker(s) 340, communications circuitry 345, image capture device 350, which may, e.g., comprise multiple camera units/optical image sensors having different characteristics or abilities (e.g., Still Image Stabilization (SIS), HDR, OIS systems, optical zoom, digital zoom, etc.), video codec(s) 355, memory 360, storage 365, and communications bus 370.

Processor 305 may execute instructions necessary to carry out or control the operation of many functions performed by electronic device 300 (e.g., such as the generation and/or processing of images in accordance with the various embodiments described herein). Processor 305 may, for instance, drive display 310 and receive user input from user interface 315. User interface 315 can take a variety of forms, such as a button, keypad, dial, a click wheel, keyboard, display screen and/or a touch screen. User interface 315 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 310 may display a video stream as it is captured while processor 305 and/or graphics hardware 320 and/or image capture circuitry contemporaneously generate and store the video stream in memory 360 and/or storage 365. Processor 305 may be a system-on-chip (SOC) such as those found in mobile devices and include one or more dedicated graphics processing units (GPUs). Processor 305 may be based on reduced instruction-set computer (RISC) or complex instruction-set computer (CISC) architectures or any other suitable architecture and may include one or more processing cores. Graphics hardware 320 may be special purpose computational hardware for processing graphics and/or assisting processor 305 perform computational tasks. In one embodiment, graphics hardware 320 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 350 may comprise one or more camera units configured to capture images, e.g., images which may be processed to generate distortion-compensated and stabilized versions of said captured images, e.g., in accordance with this disclosure. Output from image capture device 350 may be processed, at least in part, by video codec(s) 355 and/or processor 305 and/or graphics hardware 320, and/or a dedicated image processing unit or image signal processor incorporated within image capture device 350. Images so captured may be stored in memory 360 and/or storage 365. Memory 360 may include one or more different types of media used by processor 305, graphics hardware 320, and image capture device 350 to perform device functions. For example, memory 360 may include memory cache, read-only memory (ROM), and/or random access memory (RAM). Storage 365 may store media (e.g., audio, image and video files), computer program instructions or software, preference information, device profile information, and any other suitable data. Storage 365 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 360 and storage 365 may be used to retain computer program instructions or code organized into one or more modules and written in any desired computer programming language. When executed by, for example, processor 305, such computer program code may implement one or more of the methods or processes described herein. Power source 375 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 300.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a first image capture device, wherein the first image capture device comprises a first lens having a first set of lens characteristics;
a display;
a memory; and
one or more processors operatively coupled to the memory, wherein the one or more processors are configured to execute instructions causing the one or more processors to:
obtain a first image captured by the first image capture device;
determine a first set of image parameters configured to apply a first distortion operation to the first image, wherein the instructions causing the one or more processors to determine a first set of image parameters configured to apply a first distortion operation to the first image further comprise instructions configured to cause the one or more processors to:
determine a first two-dimensional (2D) mesh of vertex points distributed over the first image; and
determine a set of one more distortion parameters for each vertex point in the first 2D mesh of vertex points, wherein the first set of image parameters comprises the determined set of one more distortion parameters for each vertex point in the first 2D mesh of vertex points;
determine a second set of image parameters configured to apply a first stabilization operation to a first version of the first image that has already had the first distortion operation applied; and
apply the determined first set of image parameters and the determined second set of image parameters to the first image to generate a first output image, wherein the first output image is distortion-compensated and stabilized.

2. The device of claim 1, wherein the first distortion operation is configured to remove distortion in images captured by the first image capture device.

3. The device of claim 2, wherein the first distortion operation is based, at least in part, on the first set of lens characteristics.

4. The device of claim 3, wherein the first distortion operation is further based, at least in part, on one or more of:
a focus position of the first lens during the capture of the first image;
a focal length of the first lens during the capture of the first image; or
an Optical Image Stabilization (OIS) system position of the first lens during the capture of the first image.

5. The device of claim 1, wherein the first set of lens characteristics are determined as part of a factory calibration process or based on design specifications of the first lens.

6. The device of claim 1, wherein the instructions causing the one or more processors to apply the determined first set of image parameters and second set of image parameters to the first image to generate a first output image further comprise instructions configured to cause the one or more processors to:
apply the determined first set of image parameters and second set of image parameters to the first image in a single pass operation.

7. The device of claim 1, wherein the instructions further comprise instructions causing the one or more processors to:
determine a third set of image parameters configured to apply a second distortion operation to a second version of the first image that has already had the first distortion operation and the first stabilization operation applied,
wherein the instructions to apply the determined first set of image parameters and second set of image parameters to the first image further comprise instructions to:
apply the determined first set of image parameters, second set of image parameters, and third set of image parameters to the first image to generate the first output image.

8. The device of claim 7, wherein the first distortion operation is configured to remove distortion in images captured by the first image capture device, and wherein the second distortion operation is configured to re-apply an idealized distortion pattern aligned to the first output image.

9. The device of claim 8, wherein the instructions causing the one or more processors to apply the determined first set of image parameters, second set of image parameters, and third set of image parameters to the first image to generate a first output image further comprise instructions configured to cause the one or more processors to:
apply the determined first set of image parameters, second set of image parameters, and third set of image parameters to the first image in a single pass operation.

10. The device of claim 1, wherein the instructions causing the one or more processors to determine a first two-dimensional (2D) mesh of vertex points distributed over the first image further comprise instructions configured to cause the one or more processors to:
determine a density for the vertex points in the 2D mesh of vertex points,
wherein the determined density is based, at least in part, on an estimated amount of distortion in images captured by the first image capture device.

11. The device of claim 10, wherein the determined density comprises a non-uniform density across the 2D mesh of vertex points.

12. The device of claim 1, wherein the first distortion operation is based on approximating a rectilinear projection for the first image.

13. The device of claim 1, wherein the first distortion operation is based on approximating a curvilinear projection for the first image, and wherein the first distortion operation is further configured to remove curvilinear distortion in images captured by the first image capture device.

14. The device of claim 1, wherein the instructions further comprise instructions causing the one or more processors to:
crop the first output image to have a first set of desired dimensions or a first desired aspect ratio.

15. A non-transitory computer readable medium comprising computer readable instructions executable by one or more processors to:
obtain a first image captured by a first image capture device, wherein the first image capture device comprises a first lens having a first set of lens characteristics;
determine a first set of image parameters configured to apply a first distortion operation to the first image, wherein the instructions executable by the one or more processors to determine a first set of image parameters configured to apply a first distortion operation to the first image further comprise instructions executable by the one or more processors to:
determine a first two-dimensional (2D) mesh of vertex points distributed over the first image; and
determine a set of one more distortion parameters for each vertex point in the first 2D mesh of vertex points, wherein the first set of image parameters comprises the determined set of one more distortion parameters for each vertex point in the first 2D mesh of vertex points;

determine a second set of image parameters configured to apply a first stabilization operation to a first version of the first image that has already had the first distortion operation applied; and apply the determined first set of image parameters and the determined second set of image parameters to the first image to generate a first output image, wherein the first output image is distortion-compensated and stabilized.

16. The non-transitory computer readable medium of claim 15, wherein the instructions further comprise instructions executable by the one or more processors to:

determine a third set of image parameters configured to apply a second distortion operation to a second version of the first image that has already had the first distortion operation and the first stabilization operation applied, wherein the instructions to apply the determined first set of image parameters and second set of image parameters to the first image further comprise instructions to:

apply the determined first set of image parameters, second set of image parameters, and third set of image parameters to the first image to generate the first output image.

17. The non-transitory computer readable medium of claim 16, wherein the first distortion operation is configured to remove distortion in images captured by the first image capture device, and wherein the second distortion operation is configured to re-apply an idealized distortion pattern aligned to the first output image.

18. An image processing method, comprising:

obtaining a first image captured by a first image capture device, wherein the first image capture device comprises a first lens having a first set of lens characteristics;

determining a first set of image parameters configured to apply a first distortion operation to the first image, wherein determining a first set of image parameters configured to apply a first distortion operation to the first image further comprises:

determining a first two-dimensional (2D) mesh of vertex points distributed over the first image; and determining a set of one more distortion parameters for each vertex point in the first 2D mesh of vertex points, wherein the first set of image parameters comprises the determined set of one more distortion parameters for each vertex point in the first 2D mesh of vertex points;

determining a second set of image parameters configured to apply a first stabilization operation to a first version of the first image that has already had the first distortion operation applied; and applying the determined first set of image parameters and the determined second set of image parameters to the first image to generate a first output image, wherein the first output image is distortion-compensated and stabilized.

19. The method of claim 18, further comprising:

determining a third set of image parameters configured to apply a second distortion operation to a second version of the first image that has already had the first distortion operation and the first stabilization operation applied, wherein applying the determined first set of image parameters and second set of image parameters to the first image further comprises:

applying the determined first set of image parameters, second set of image parameters, and third set of image parameters to the first image to generate the first output image.

20. The method of claim 19, wherein the first distortion operation is configured to remove distortion in images captured by the first image capture device, and wherein the second distortion operation is configured to re-apply an idealized distortion pattern aligned to the first output image.

21. An image processing method, comprising:

obtaining a first image captured by a first image capture device, wherein the first image capture device comprises a first lens having a first set of lens characteristics;

generating a first output image from the first image by performing the following operations on the first image:

a first distortion operation, wherein performing the first distortion operation further comprises determining a first set of image parameters configured to apply the first distortion operation to the first image, and wherein determining the first set of image parameters further comprises:

determining a first two-dimensional (2D) mesh of vertex points distributed over the first image; and determining a set of one more distortion parameters for each vertex point in the first 2D mesh of vertex points, wherein the first set of image parameters comprises the determined set of one more distortion parameters for each vertex point in the first 2D mesh of vertex points;

a first stabilization operation using an output of the first distortion operation; and a second distortion operation using an output of the first stabilization operation.

22. The method of claim 21, wherein the output of the first distortion operation comprises an undistorted version of the first image.

23. The method of claim 22, wherein the output of the first stabilization operation comprises a stabilized and undistorted version of the first image.

24. The method of claim 23, wherein the second distortion operation is configured to re-apply an idealized distortion pattern that is aligned to the first output image to the stabilized and undistorted version of the first image.

25. The method of claim 21, wherein the output of the first stabilization operation comprises a second set of image parameters configured to apply the first stabilization operation to a first version of the first image that has already had the first distortion operation applied.

26. The method of claim 25, wherein performing the second distortion operation comprises: determining a third set of image parameters configured to apply the second distortion operation to a second version of the first image that has already had the first distortion operation and the first stabilization operation applied.

27. The method of claim 26, wherein performing the second distortion operation further comprises: applying the determined first set of image parameters, second set of image parameters, and third set of image parameters to the first image to generate the first output image.

28. The method of claim 26, wherein the second distortion operation is configured to re-apply an idealized distortion pattern that is aligned to the first output image to the second version of the first image that has already had the first distortion operation and the first stabilization operation applied.

* * * * *